(12) United States Patent
Swei et al.

(10) Patent No.: US 8,900,677 B2
(45) Date of Patent: Dec. 2, 2014

(54) PRINT MEDIUM

(75) Inventors: Jason Swei, San Diego, CA (US); Sandeep K Bangaru, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/233,748

(22) PCT Filed: Jul. 21, 2011

(86) PCT No.: PCT/US2011/044858
§ 371 (c)(1),
(2), (4) Date: Jan. 18, 2014

(87) PCT Pub. No.: WO2013/012425
PCT Pub. Date: Jan. 24, 2013

(65) Prior Publication Data
US 2014/0154433 A1 Jun. 5, 2014

(51) Int. Cl.
*B41M 5/00* (2006.01)
*B41M 5/52* (2006.01)
*B41M 5/50* (2006.01)
*B05D 1/00* (2006.01)
*C04B 41/00* (2006.01)

(52) U.S. Cl.
CPC .......... *B41M 5/5218* (2013.01); *B41M 5/5254* (2013.01); *B41M 5/508* (2013.01); *B41M 5/52* (2013.01); *B05D 1/00* (2013.01); *C04B 41/009* (2013.01); *B41M 5/502* (2013.01); *B41M 5/506* (2013.01)
USPC ................... 428/32.21; 428/32.24; 428/32.25; 428/32.28; 428/32.32; 428/32.34; 428/32.35; 427/243

(58) Field of Classification Search
CPC .... B41M 5/5218; B41M 5/52; B41M 5/5254; B41M 5/506; B41M 5/508; B41M 5/502; B05D 1/00; C04B 41/009
USPC .......... 428/32.21, 32.24, 32.25, 32.28, 32.32, 428/32.34, 32.35; 427/243
See application file for complete search history.

(56) References Cited

U.S. PATENT DOCUMENTS 5,776,619 A 7/1998 Shanton et al.
5,879,442 A * 3/1999 Nishiguchi et al. ........... 106/464

(Continued)

FOREIGN PATENT DOCUMENTS

EP 1288011 A2 3/2003

OTHER PUBLICATIONS

Taina Lamminmaki, John Kettle, Pasi Puukko, Jukka Ketoja, and Patrick Gane, "The role of binder type in determining inkjet print quality," Nordic Pulp and Paper Research Journal, 2010, pp. 380-390, vol. 25, No. 3.

(Continued)

*Primary Examiner* — Betelhem Shewareged (57) ABSTRACT

A print medium includes a first layer on at least one of a first side and a second side of a substrate and a second layer. The first layer consists essentially of at least 80% by dry weight of one or more particulate inorganic pigments (PIPs). A combination of a particle size and a coat weight of the first layer on the substrate yields an effective pore size of the first layer in a range of about 0.008 to about 0.5 microns. For two or more PIPs in the first layer, the average particle size of one of the PIPs differs by no more than about 50% from the average particle size of another of the PIPs. The second layer is on top of the first layer and includes a particulate inorganic pigment (PIP) having an average particle size of about 0.1 to about 2 microns.

15 Claims, 4 Drawing Sheets

(56) References Cited

U.S. PATENT DOCUMENTS

| | | |
|---|---|---|
| 6,150,289 A | 11/2000 | Chen et al. |
| 6,808,767 B2 | 10/2004 | Schliesman et al. |
| 7,682,438 B2 | 3/2010 | Song et al. |
| 7,829,160 B2 | 11/2010 | Schultz et al. |
| 7,955,667 B2 | 6/2011 | McManus et al. |
| 2004/0096598 A1 | 5/2004 | Kasamatsu et al. |
| 2009/0130312 A1 | 5/2009 | Ono et al. |
| 2009/0130320 A1 | 5/2009 | Kawakami et al. |
| 2010/0092678 A1 | 4/2010 | Zeng |
| 2010/0304124 A1 | 12/2010 | Haenen et al. |
| 2011/0008542 A1 | 1/2011 | Zeng et al. |
| 2011/0011547 A1 | 1/2011 | Song et al. |
| 2011/0115868 A1 | 5/2011 | Chen et al. |
| 2014/0154433 A1* | 6/2014 | Swei et al. .............. 428/32.32 |

OTHER PUBLICATIONS

International Search Report and Written Opinion (ISR/WO) dated Mar. 28, 2012 for counterpart PCT application No. PCT/US2011/044858 (9 pages).

Extended European Search Report (EESR) with supplementary European search report and opinion (10 pages) from the European Patent Office, dated May 12, 2014, for foreign counterpart European patent application, No. 11869605.

* cited by examiner

PRINT MEDIUM

CROSS-REFERENCE TO RELATED APPLICATIONS

N/A

STATEMENT REGARDING FEDERALLY SPONSORED RESEARCH OR DEVELOPMENT

N/A

BACKGROUND

Inkjet printers are now very common and affordable and allow one to obtain decent print quality. They are used in home printing, office printing and commercial printing. The growth of inkjet printing is a result of a number of factors including reductions in cost of inkjet printers and improvements in print resolution and overall print quality. A continued demand in inkjet printing has resulted in a need to produce images of high quality, high permanence, good bleed and coalescence performance, good image gloss and high durability while maintaining a reasonable cost.

Two approaches that have been employed for making a coated glossy media that may be used in inkjet printing involve coatings with salt and coatings without salt. The coatings with salt have good bleed and coalescence characteristics, but not as good image gloss and durability. The coatings without salt have good durability and image gloss characteristics, but not as good bleed and coalescence. In some instances bonding agents may be employed; however, such agents do not improve all of these characteristics. In some instances coated print media having the requisite print characteristics may be employed. Unfortunately, such print media are coated with materials that are too expensive for commercial printing.

High speed inkjet web printing is a printing technology developed during recent years especially for commercial printing. However, print media face many challenges when used in high speed inkjet web printing. For example, glossy media for inkjet web printing has a trade-off between gloss and absorptivity of the media. Another trade-off is encountered between print durability and print quality (especially density and color gamut volume).

BRIEF DESCRIPTION OF THE DRAWINGS

The drawings provided herein are for the purpose of facilitating the understanding of various features of examples of the principles described herein with reference to the following detailed description, where like reference numerals designate like structural elements, and are provided by way of illustration and not limitation on the scope of the appended claims.

DETAILED DESCRIPTION

Examples in accordance with the principles described herein are directed to a print medium, which comprises a print medium substrate, a first layer and a second layer associated therewith. The print medium substrate comprises a first side and a second side. The first layer is on at least one of the first side and the second side of the print medium substrate. The first layer consists essentially of one or more particulate inorganic pigments wherein, for two or more particulate inorganic pigments in the first layer, the average particle size of one of the particulate inorganic pigments differs by no more than about 50% from the average particle size of the another of the particulate inorganic pigments. A combination of a particle size and a coat weight of the first layer on the print medium substrate yields effective pore sizes of the first layer in the range of about 0.008 microns to about 0.5 microns. The second layer is on top of the first layer and comprises a particulate inorganic pigment having an average particle size of about 0.1 to about 2 microns.

A print medium in accordance with the principles described herein may be used to prepare printed images by dispensing ink to the print medium. The second layer and the first layer are absorptive to the ink. In some examples, the print medium may avoid the trade-offs exhibited by glossy media, e.g., in inkjet web printing. By choosing an average particle size and a coat weight for the first layer, the resulting printed images have a high degree of gloss, good black optical density and excellent durability and print quality. High print density and color gamut volume are realized with substantially no visual color-to-color bleed and with good coalescence characteristics. The print medium in accordance with the principles described herein is a coated glossy medium that can print at speeds needed for commercial and other printers such as, for example, a Hewlett Packard (HP) Inkjet Web Press (Hewlett Packard Inc., Palo Alto Calif.) and has the properties and characteristics mentioned above such as good bleed and coalescence, good durability, and high image gloss. Moreover, the properties and cost of the print medium in accordance with the principles described herein are comparable to coated media for offset printing.

The print medium substrate (i.e., 'substrate') comprises a material that serves as a base upon which the first layer and the second layer are applied. The print medium substrate provides integrity for the resultant print medium. The material should have one or both of good affinity and good compatibility for the ink that is applied to the material. Examples of print medium substrates include, but are not limited to, natural cellulosic material, synthetic cellulosic material (such as, for example, cellulose diacetate, cellulose triacetate, cellulose propionate, cellulose butyrate, cellulose acetate butyrate and nitrocellulose), material comprising one or more polymers such as, for example, polyolefins, polyesters, polyamides, ethylene copolymers, polycarbonates, polyurethanes, polyalkylene oxides, polyester amides, polyethylene terephthalate, polyethylene, polystyrene, polypropylene, polycarbonate, polyvinyl acetal, polyalkyloxazolines, polyphenyl oxazolines, polyethylene-imines, polyvinyl pyrrolidones, and combinations of two or more of the above, for example. In some examples the print medium substrate comprises a paper base including, for example, paper, cardboard, paperboard, paper laminated with plastics, and paper coated with resin, for example.

The print medium substrate may be planar, either smooth or rough, or such other shape that is suitable for the particular purpose for which it is employed. The print medium substrate may be porous or non-porous, rigid, semi-rigid, or flexible, for example. Planar substrates may be in the form, for example, of a film, plate, board, a web or sheet by way of illustration and not limitation.

The basis weight of the print medium substrate is dependent on the nature of the application of the print medium where lighter weights are employed for magazines and tri-folds and heavier weights are employed for post cards, for example. In some examples in accordance with the principles described herein wherein the print medium is employed in web printing applications, the print medium has a basis weight of about 60 grams per square meter (gsm) to about 300 gsm, or about 100 gsm to about 250 gsm, for example.

As mentioned above, a first layer is associated with at least one of a first side and a second side of the print medium substrate. In some examples in accordance with the principles described herein, the first layer is associated with both the first side and the second side of the print medium substrate. The first layer comprises a particulate inorganic pigment. A combination of a particle size and a coat weight of the first layer on the print medium substrate yield effective pore sizes of the first layer in the range of about 0.008 microns to about 0.5 microns.

The phrase "effective pore size" refers to the pores that are formed by a particulate inorganic pigment associated with a print medium substrate. The effective pores are formed by a combination of an average particle size of the particulate inorganic pigment, a particle size distribution of the particulate inorganic pigment and a coat weight of the particulate inorganic pigment. The phrase "particle size" refers to the diameter of a particle as if the particle were spherical. The phrase "average particle size" refers to the sum of all of the sizes of the particles divided by the total number of particles. The phrase "median particle size" refers to the particle size where 50 mass percent of the particles have a larger diameter and the other 50 mass percent have a smaller diameter.

The phrase "particle size distribution" refers to the percentage of particles falling within a particular size range. For example, about 65% to about 90%, or about 65% to about 85%, or about 70% to about 90%, or about 70% to about 85%, or 75% to about 85%, of the particles have a certain particle size or particle size range (for purposes of illustration and not limitation, an example is a particle size distribution where about 75% to about 85% of the particles have a particle size in a range of about 1.0 to about 1.4 microns).

In accordance with the principles described herein, the average particle size or the median particle size of the particulate inorganic pigment of the first layer is about 0.5 to about 10 microns, or about 0.5 to about 8 microns, or about 0.5 to about 6 microns, or about 0.5 to about 4 microns, or about 0.5 to about 2 microns, or about 0.5 to about 1 micron, or about 0.75 to about 10 microns, or about 0.75 to about 8 microns, or about 0.75 to about 6 microns, or about 0.75 to about 4 microns, or about 0.75 to about 2 microns, or about 0.75 to about 1 micron, or about 2 to about 10 microns, or about 2 to about 8 microns, or about 2 to about 6 microns, or about 2 to about 4 microns, or about 1 to about 2 microns, for example.

The particle size distribution discussed above applies to any of the average particle sizes or median particle sizes or particles size ranges set forth above for the particles (particulate inorganic pigment) of the first layer. For example, a particulate inorganic pigment with an average particle size of about 1.2 microns may have a particle size distribution where particles in the range of about 1 micron to about 4 microns are about 80% of all of the particles of the pigment. In some examples, for a certain percentage of particles (for example, at least about 50%, or at least about 55%, or at least about 60%, or at least about 65%, or at least about 70%, or at least about 75%, or at least about 80%, or at least about 85%, or at least about 90%), the particle sizes of particles of an inorganic pigment are within about 50%, or within about 45%, or within about 40%, or within about 35%, or within about 30%, or within about 25%, or within about 20%, or within about 15%, or within about 10% of a particular particle size (about 1.2 microns in the example above).

Without wishing to be held to any theory of operation, the particle size distribution should be such that the first layer combined with a second layer results in a coating having an effective pore size in the range of about 0.008 to about 0.5 microns. If the particle size distribution has too wide a range, then smaller particles will fill in the gaps between larger particles, resulting in an inability of obtaining the aforementioned effective pore size range.

A combination of an average particle size and a coat weight of the first layer on the print medium substrate yields an effective pore size of the first layer in the range of about 0.008 microns to about 0.5 microns, or about 0.008 microns to about 0.4 microns, or about 0.008 microns to about 0.3 microns, or about 0.008 microns to about 0.2 microns, or about 0.008 microns to about 0.1 microns, or about 0.01 microns to about 0.5 microns, or about 0.01 microns to about 0.4 microns, or about 0.01 microns to about 0.3 microns, or about 0.01 microns to about 0.2 microns, or about 0.01 microns to about 0.1 microns, or about 0.05 microns to about 0.5 microns, or about 0.05 microns to about 0.4 microns, or about 0.05 microns to about 0.3 microns, or about 0.05 microns to about 0.2 microns, or about 0.05 microns to about 0.1 microns, for example.

Particulate inorganic pigments (i.e., 'PIPs') suitable for the first layer, by way of illustration and not limitation, include calcined clay, ultra-fine precipitated calcium carbonate, modified calcium carbonate, and ground calcium carbonate, for example, with the above average particle size and particle size distribution. In some examples in accordance with the principles described herein, the particulate inorganic pigment (i.e., 'PIP'), by way of illustration and not limitation, is KAOCAL® calcined clay (particle size distribution of about 83-92% particles finer than 2 microns) (from Thiele Kaolin Company, Sandersville Ga.); OMYAJET® B5260 ultrafine precipitated calcium carbonate (average particle size of about 2.4 microns) (from Omya Inc., Florence Vt.); or a mixture of KAOCAL® calcined clay and HYDROCARB® 60 fine ground calcium carbonate (average particle size of about 1.5 microns) (from Omya Inc.) wherein the mixture comprises by dry weight at least about 50%, or at least about 55%, or at least about 60%, or at least about 65%, or at least about 70%, or at least about 75%, or at least about 80%, or at least about 85%, or at least about 90%, of KAOCAL® calcined clay, for example.

In some examples, a combination of two or more inorganic pigments may be desirable for improving characteristics of the composition for purposes of applying it to a print medium substrate. Such characteristics include, but are not limited to, coatability, rheology and coating solids, for example. One or more of the members of the combination of inorganic pigments, by itself, may not be suitable for the first layer. However, such an inorganic pigment(s) may be combined with a particulate inorganic pigment suitable for the first layer to improve the properties of the suitable particulate inorganic pigment as discussed above.

In some examples in accordance with the principles described herein, the first layer comprises at least 80%, or at least 85%, or at least 90%, or at least 95% by dry weight of a particulate inorganic pigment such as, but not limited to, calcined clay, modified calcium carbonate, ground calcium carbonate, ultrafine precipitated calcium carbonate, and combinations of two or more thereof. For a combination of particulate inorganic pigments in some examples in accordance with the principles described herein, average particle sizes of the pigments do not differ by more than about 50%, or than about 45%, or than about 40%, or than about 35%, or than about 30%, or than about 25%, or than about 20%, or than about 15%, or than about 10%, or than about 5%.

In some examples in accordance with the principles described herein, the first layer further comprises one or more polymeric binders in a total amount by dry weight of about 2% to about 20%, or about 2% to about 15%, or about 2% to about 10%, or about 2% to about 8%, or about 2% to about 6%, or about 2% to about 4%, or about 2% to about 3%, or about 3% to about 10%, or about 3% to about 8%, or about 3% to about 6%, or about 3% to about 4%, or about 4% to about 10%, or about 4% to about 8%, or about 4% to about 6%, or about 4% to about 5%, or about 5% to about 10%, or about 5% to about 8%, or about 5% to about 6%, for example.

The polymeric binder may be, but is not limited to, latex polymers, polyvinyl alcohols and polyvinyl pyrrolidones, for example. The latex polymer may be derived from a number of monomers such as, by way of example and not limitation, vinyl monomers, allylic monomers, olefins, and unsaturated hydrocarbons, and mixtures thereof. Classes of vinyl monomers include, but are not limited to, vinyl aromatic monomers (e.g., styrene), vinyl aliphatic monomers (e.g., butadiene), vinyl alcohols, vinyl halides, vinyl esters of carboxylic acids (e.g., vinyl acetate), vinyl ethers, (meth)acrylic acid, (meth) acrylates, (meth)acrylamides, (meth)acrylonitriles, and mixtures of two or more of the above, for example. The term "(meth)acrylic latex" includes polymers of acrylic monomers, polymers of methacrylic monomers, and copolymers of the aforementioned monomers with other monomers. In some embodiments the polymer is a latex polymer.

Examples of vinyl aromatic monomers that may form the latex polymeric binder include, but are not limited to, styrene, 3-methylstyrene, 4-methylstyrene, styrene-butadiene, p-chloro-methylstyrene, 2-chlorostyrene, 3-chlorostyrene, 4-chlorostyrene, divinyl benzene, vinyl naphthalene and divinyl naphthalene. Vinyl halides that may be used include, but are not limited to, vinyl chloride and vinylidene fluoride. Vinyl esters of carboxylic acids that may be used include, but are not limited to, vinyl acetate, vinyl butyrate, vinyl methacrylate, vinyl 3,4-dimethoxybenzoate, vinyl malate and vinyl benzoate. Examples of vinyl ethers that may be employed include, but are not limited to, butyl vinyl ether and propyl vinyl ether, for example.

In some examples in accordance with the principles described herein, the binder may be a styrene/butadiene latex copolymer. In some examples, the binder may be a styrene/butadiene/acrylonitrile latex copolymer. In some examples in accordance with the principles described herein, the latex polymer is, but is not limited to, GENCRYL® 9525 styrene/butadiene/acrylonitrile copolymer (from RohmNova, Akron Ohio), GENCRYL® 9750 styrene/butadiene/acrylonitrile (from RohmNova), STR 5401 styrene/butadiene (from Dow Chemical Company, Midland Mich.), MOWIOL® 4-98 polyvinyl alcohol (Kuraray America, Inc., Houston Tex.), for example, or a combination of two or more of the above.

Other components that may be present in a composition for forming a first layer in accordance with the principles described herein include one or more additives affecting various properties of the composition. The additives include, but are not limited to, one or more of rheology modifiers, surfactants or wetting agents, and dispersing agents, for example. The total amount by weight of additives in the composition for forming the first layer is about 0.1% to about 2%, or about 0.1% to about 1%, or about 0.1% to about 0.5%, or about 0.1% to about 0.2%, or about 0.2% to about 1%, or about 0.2% to about 0.5%, or about 0.5% to about 1%, for example.

As mentioned above, the first layer is associated with the print medium. The phrase "associated with" means that a layer is, for example, formed on, coated on, adsorbed on or absorbed in at least one surface of the print medium substrate. The association between a layer and a surface of the print medium substrate is achieved by bringing the substrate and composition forming the layer into contact by, for example, spraying, dipping and coating (including, e.g., roll, blade, rod, slot die, or curtain coating).

A composition comprising the components of the first layer is employed to form the first layer on the first side or on the first side and the second side of the print medium substrate. In some examples, the composition is an aqueous-based medium that comprises one or more particulate inorganic pigments and one or more of a polymeric binder, a surfactant, a rheology modifier, a dye, and an optical brightening agent. The amount of each respective component mentioned above is present in the composition so that the resulting first layer in the dry state has the aforementioned amounts of the respective components.

In some examples where the print medium substrate is base paper stock, the composition for forming the first layer can be applied on the base paper stock by an on-line surface size press process such as a puddle-sized press or a film-sized press, for example. In addition to on-line surface sizing processing, off-line coating technologies can also be used to apply the composition for forming the first layer to the print medium substrate. Examples of suitable coating techniques include, but are not limited to, slot die coaters, roller coaters, fountain curtain coaters, blade coaters, rod coaters, air knife coaters, gravure applications, and air brush applications, for example.

As mentioned above, in a print medium in accordance with the principles described herein, a second layer is associated with the first layer, which may be on the first side or on the first side and the second side of the print medium substrate. The second layer comprises one or more particulate inorganic pigments (PIPs) and one or more of a polymeric binder, a surfactant, a rheology modifier, a dye, and an optical brightening agent, for example.

In accordance with the principles described herein, the average particle size or the median particle size of the particulate inorganic pigment (PIP) of the second layer is about 0.1 to about 2 microns, or about 0.1 to about 1.5 microns, or about 0.1 to about 1 micron, or about 0.1 to about 0.5 microns, or about 0.2 to about 2 microns, or about 0.2 to about 1.5 microns, or about 0.2 to about 1 micron, or about 0.2 to about 0.5 microns, or about 0.5 to about 2 microns, or about 0.5 to about 1.5 microns, or about 0.5 to about 1 micron, for example. The particle size distribution discussed above applies to any of the average particle sizes or median particle sizes or particles size ranges set forth above for the particles (particulate inorganic pigment) of the second layer. For example, by way of illustration and not limitation, a particulate inorganic pigment with an average particle size of about 1.2 microns may have a particle size distribution where particles in the range of about 1 micron to about 4 microns are about 80% of all of the particles of the pigment.

Particulate inorganic pigments suitable for the second layer, by way of illustration and not limitation, include clay, calcined clay, precipitated calcium carbonate, ground calcium carbonate, dolomite, aluminum silicate, mica, magnesium carbonate, silica, alumina, boehmite, talc, and combinations of two or more of the above, for example, with the above average particle size and particle size distribution set forth above. In some examples in accordance with the principles described herein, the particulate inorganic pigment of the second layer, by way of illustration and not limitation, is OMYAPRIME® HG30 calcium carbonate (average particle size of about 0.27 microns) (from Omya Inc.); OPACARB® A40 precipitated calcium carbonate (average particle size of about 0.4 microns) (from Specialty Minerals Inc., Bethlehem Pa.), HYDRAFINE® 90W fine clay (about 90%-96% particles finer than 2 microns) (from KaMin LLC, Sandersville Ga.); and combinations of the above, for example.

In some examples in accordance with the principles described herein, the second layer further comprises a polymeric binder in an amount by dry weight of about 2% to about 20%, or about 2% to about 15%, or about 2% to about 10%, or about 2% to about 8%, or about 2% to about 6%, or about 2% to about 4%, or about 2% to about 3%, or about 3% to about 10%, or about 3% to about 8%, or about 3% to about 6%, or about 3% to about 4%, or about 4% to about 10%, or about 4% to about 8%, or about 4% to about 6%, or about 4% to about 5%, or about 5% to about 10%, or about 5% to about 8%, or about 5% to about 6%, for example.

The polymeric binder may be any one of the polymeric binders listed above for the first layer or combinations of two or more thereof. In addition, the composition for forming the second layer may comprise one or more of the additives mentioned above with regard to the composition for forming the first layer.

In some examples in accordance with the principles described herein the second layer also comprises one or more dyes such as, but not limited to, violet dye, for example. An amount of a dye in the second layer is that sufficient or effective to enhance the color of the second layer. In some examples, an amount of dye by dry weight in the second layer is about 0.001% to about 0.01%, or about 0.005% to about 0.01%, for example.

In some examples in accordance with the principles described herein the second layer also comprises one or more optical brightening agents (OBA), for example. An amount of OBA in the second layer is that sufficient or effective to enhance the brightness of the second layer. In some examples, an amount of OBA by dry weight in the second layer is about 0.01% to about 0.5%, or about 0.1% to about 0.5%.

In some examples, a composition for forming the first layer is associated with a surface of print medium substrate to form a layer on the surface followed by association of a composition for forming the second layer on the first layer on the surface.

A composition comprising the components of the second layer is employed to associate the second layer with the first layer, which as discussed above may be on the first side or on the first side and the second side of the print medium substrate. In some examples, the composition for forming the second layer is an aqueous-based medium that comprises one or more particulate inorganic pigments and one or more of a polymeric binder, a dye, and an optical brightening agent, for example. The amount of each respective component mentioned above is present in the composition so that the resulting second layer in the dry state has the aforementioned amounts of the respective components.

Following application of each of the composition for forming the first layer on the print medium substrate and the composition for forming the second layer on the first layer, the print medium substrate may be subjected to conditions for drying the composition. The resulting print medium substrate is then stored under appropriate conditions until use.

An amount of the first layer and an amount of the second layer on the print medium in the dry state is at least sufficient to hold all of the ink that is to be applied to the print medium. The coat weight of the first layer on a side of the print medium substrate is about 2 to about 30 grams per square meter (gsm), or about 2 to about 25 gsm, or about 2 to about 20 gsm, or about 2 to about 15 gsm, or about 2 to about 10 gsm, or about 2 to about 5 gsm, or about 5 to about 30 gsm, or about 5 to about 25 gsm, or about 5 to about 20 gsm, or about 5 to about 15 gsm, or about 5 to about 10 gsm, or about 10 to about 30 gsm, or about 10 to about 25 gsm, or about 10 to about 20 gsm, or about 10 to about 15 gsm, for example. The coat weight of the second layer on a side of the print medium substrate is about 2 to about 30 gsm, or about 2 to about 25 gsm, or about 2 to about 20 gsm, or about 2 to about 15 gsm, or about 2 to about 10 gsm, or about 2 to about 5 gsm, or about 5 to about 30 gsm, or about 5 to about 25 gsm, or about 5 to about 20 gsm, or about 5 to about 15 gsm, or about 5 to about 10 gsm, or about 10 to about 30 gsm, or about 10 to about 25 gsm, or about 10 to about 20 gsm, or about 10 to about 15 gsm, for example.

Figure 1:
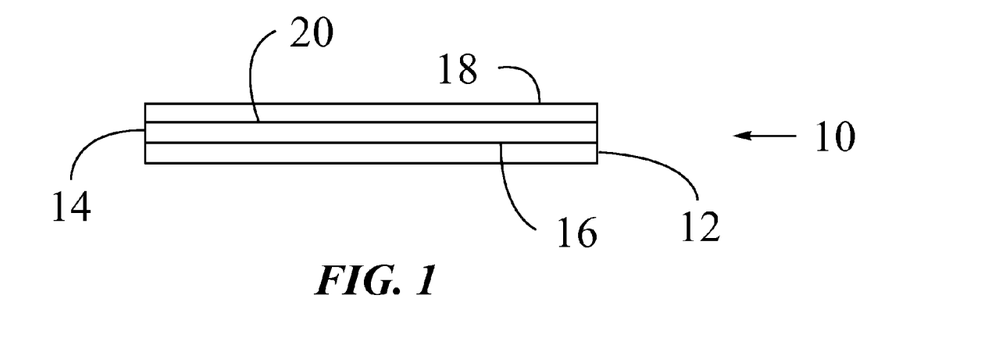
FIG. 1 illustrates in macroscale a schematic of a print medium according to an example in accordance with the principles described herein.

An example of a print medium in accordance with the principles described herein, by way of illustration and not limitation, is shown in FIG. 1. Print medium 10 comprises planar substrate 12 having first layer 14 on surface 16 of planar substrate 12 and second layer 18 on surface 20 of first layer 14.

Figure 2:
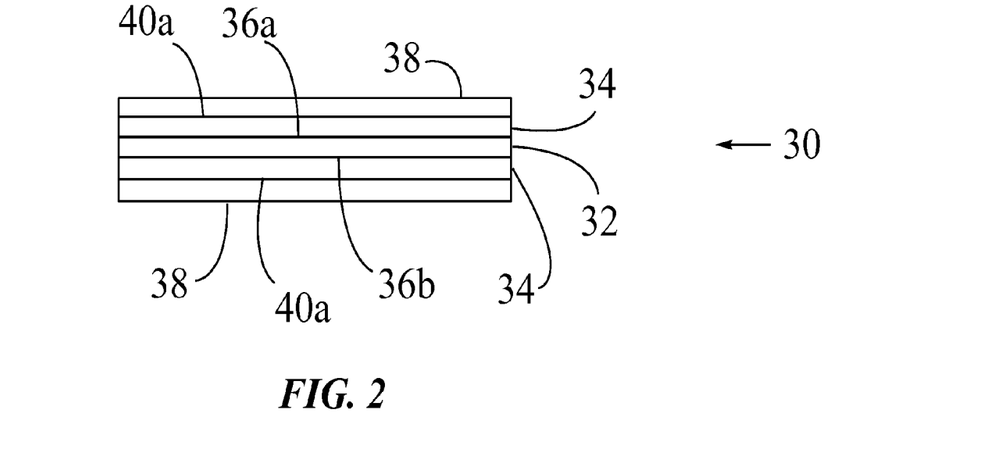
FIG. 2 illustrates in macroscale a schematic of a print medium according to another example in accordance with the principles described herein.

Another example of a print medium in accordance with the principles described herein, by way of illustration and not limitation, is shown in FIG. 2. Print medium 30 comprises planar substrate 32 having first layer 34 on surfaces 36*a* and 36*b* of planar substrate 32 and second layer 38 on surfaces 40*a* and 40*b* of first layer 34.

Figure 3:
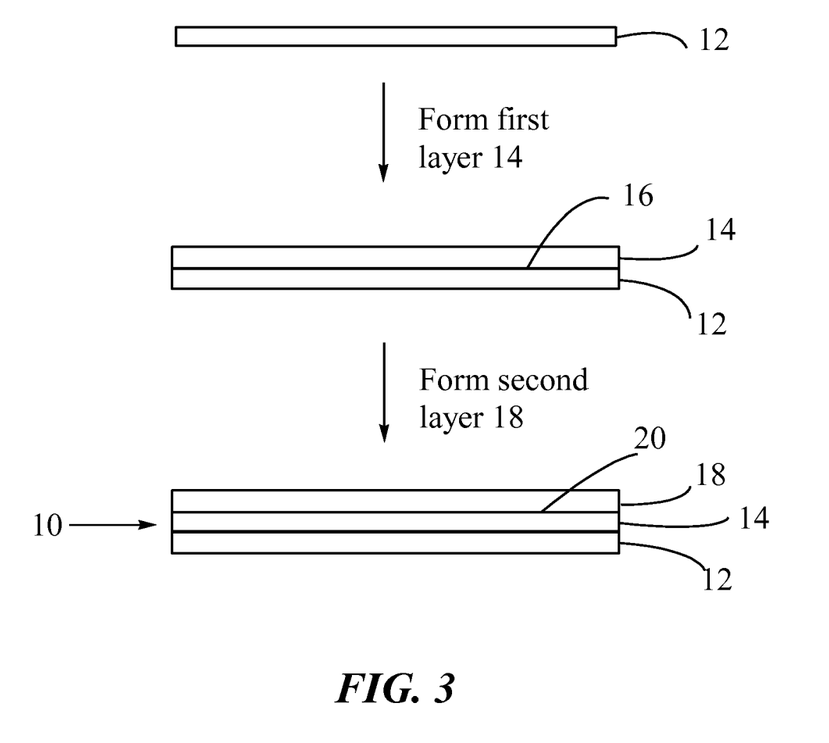
FIG. 3 is a diagram illustrating a method of preparing a print medium according to an example in accordance with the principles described herein.

In accordance with the principles described herein and by way of illustration and not limitation, an example of a method for preparing a print medium as exemplified in FIG. 1, by way of illustration and not limitation, is shown in FIG. 3. First layer 14 is formed on surface 16 of planar substrate 12 by any of the methods discussed above. Second layer 18 is formed on surface 20 of first layer 14 by any of the methods discussed above, resulting in print medium 10.

Figure 4:
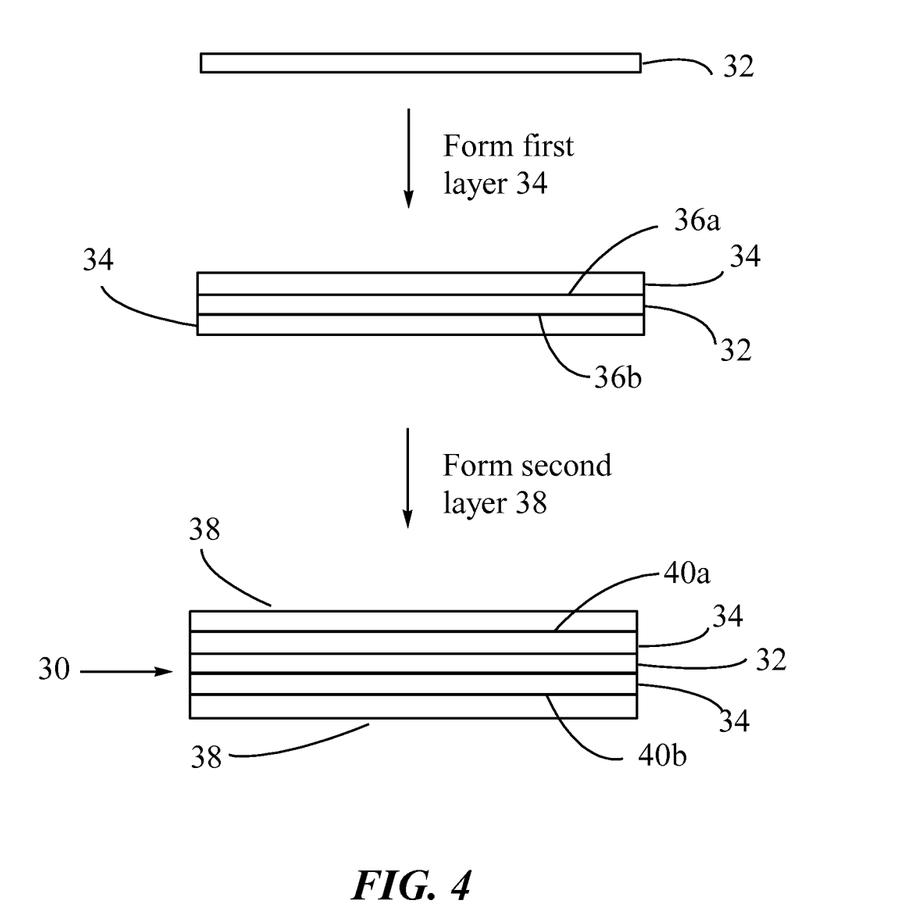
FIG. 4 is a diagram illustrating a method of preparing a print medium according to another example in accordance with the principles described herein.

In accordance with the principles described herein and by way of illustration and not limitation, an example of a method for preparing a print medium as exemplified in FIG. 2 is shown in FIG. 4. First layer 34 is formed on surfaces 36*a* and 36*b* of planar substrate 32 by any of the methods discussed above. Second layer 38 is formed on surfaces 40*a* and 40*b* of first layer 34, also by any of the methods discussed above. Print medium 30 comprises planar substrate 32 having first layer 34 on surfaces 36*a* and 36*b* of planar substrate 12. Second layer 38 is associated with surfaces 40*a* and 40*b* of first layer 34.

As mentioned above, a print medium in accordance with the principles described herein may be employed to print images on one or more surfaces of the print medium. In some examples, a method of printing an image comprises depositing ink that comprises particulate colorants. A temperature of the print medium during the printing process is dependent on one or more of the nature of the printer, for example. Any suitable printer may be employed such as, but not limited to, offset printers and inkjet printers, for example. In an example, the printer is a HP EDGELINE® CM8060 printer (Hewlett Packard Inc.).

The printed image may be dried after printing. The drying stage may be conducted, by way of illustration and not limitation, by hot air, electrical heater or light irradiation (e.g., IR lamps), or a combination of such drying methods. In order to achieve best performance it is advisable to dry the ink at a maximum temperature allowable by the print medium that enables good image quality without deformation. Examples of a temperature during drying include about 90° C. to about 205° C., or about 120° C. to about 180° C., for example.

DEFINITIONS

The following provides definitions for terms and phrases used above, which were not previously defined.

The phrase "at least" as used herein means that the number may be equal to or greater than the number recited.

The phrase "about" as used herein means a value that is within the normal tolerances of the equipment used to measure the value, or in some examples, may mean that the value recited may differ by plus or minus 10%, or plus or minus 5%, or plus or minus 1%, unless otherwise stated.

The term "between" when used in conjunction with two numbers such as, for example, "between about 2 and about 50" includes both of the numbers recited, in some examples.

The designations "first" and "second" as used herein do not imply any order of importance or any particular sequence, unless otherwise stated.

EXAMPLES

Unless otherwise indicated, materials in the experiments below may be purchased from Aldrich Chemical Company, St. Louis Mo. Parts and percentages are by weight unless indicated otherwise. STR® 5401 modified styrene-butadiene polymer was from Dow Chemical Company.

In the following examples, print media were prepared as follows. In some examples, a composition for forming a first layer on a paper base (76 gsm) was applied to both surfaces of the paper by a bench top blade coater and then was dried with a heat gun for a period of 60 seconds; the coat weight was 15 gsm.

In some examples, a composition for forming a second layer was applied to both surfaces of the paper by a bench top blade coater and the coated paper was dried with a heat gun for a period of 60 seconds; the coat weight was 6 gsm.

In some examples, a composition for forming a first layer on a base paper (76 gsm) was applied to both surfaces of the paper by a bench top blade coater and then was dried with a heat gun for a period of about 60 seconds (coat weight of 15 gsm) and then a composition for forming a second layer was applied to a surface of the first layer by a bench top blade coater and the coated paper was dried with a heat gun for a period of about 60 seconds (coat weight of 6 gsm).

The paper was coated with the compositions using a bench top blade coater (from Euclid Coating Systems, Inc., Bay City Mich.) and then was calendered on the pilot calender (Independent Machine Company, Fairfield N.J.) at 22063 kiloPascals (kPa) (3200 pounds per square inch (psi)), 54.4° C. (130° F.), 2 passes. Samples were printed on an HP EDGELINE® CM8060 printer (Hewlett Packard Inc.) (with pigment inks from the HP T300 Web Press ink set (Hewlett Packard Inc.) in a 1-pass and 2-pass print mode. The print media were tested for gamut, KOD, bleed, coalescence, absorption, 75° gloss, and durability using tests carried out as described below.

For the following examples of compositions for a first layer (Examples 1-7), the second layer was that of Example 8 below.

Example 1

Composition for forming the first layer was KAOCAL® calcined clay (Thiele Kaolin Company) (about 50% slurry in water) (100 parts) combined with STR® 5401 modified styrene-butadiene polymer (6 parts).

Example 2

Composition for forming the first layer was OMYAJET® B5260 ultrafine precipitated calcium carbonate (Omya Inc.) (about 31% slurry in water) (100 parts) combined with STR® 5401 modified styrene-butadiene polymer (6 parts).

Example 3

Composition for forming the first layer was HYDROCARB® 60 fine ground calcium carbonate (Omya Inc.) (about 70% slurry in water) (100 parts) combined with STR® 5401 modified styrene-butadiene polymer (6 parts).

Example 4

Composition for forming the first layer was HYDROCARB® PG3 ground calcium carbonate (Omya Inc.) (about 70% slurry in water) (100 parts) combined with STR® 5401 modified styrene-butadiene polymer (6 parts).

Example 5

Composition for forming the first layer was COVERCARB® 75 ground calcium carbonate (Omya Inc.) (about 70% slurry in water) (100 parts) combined with STR® 5401 modified styrene-butadiene polymer (6 parts).

Example 6

Composition for forming the first layer was a modified calcium carbonate (MCC) (Omya, Inc.) (about 36% slurry in water) (100 parts) combined with STR® 5401 modified styrene-butadiene polymer (6 parts).

Example 7

Composition for forming the first layer was KAOCAL® calcined clay (Thiele Kaolin Company) (about 50% slurry in water) (60 parts) and HYDROCARB® 60 fine ground calcium carbonate (Omya Inc.) (about 70% slurry in water) (40 parts) combined with STR® 5401 modified styrene-butadiene polymer (6 parts). Although not shown in Table 1, the above composition was prepared varying the ratio of parts of KAOCAL® calcined clay and HYDROCARB® fine ground calcium carbonate as follows: 80:20 and 40:60. These latter compositions exhibited good effective pore sizes.

The results of bleed performance for the compositions of Examples 1-7 are summarized in Table 1. Lower numbers indicate better bleed performance, which is given as microns (μm). Bleed numbers less than 381 microns are acceptable bleed performance for the first layer materials. Examples 1, 2, 6 and 7 exhibited acceptable bleed performance.

TABLE 1

| First Layer Example | Bleed (μm) |
|---|---|
| 1 | 274.32 |
| 2 | 246.38 |
| 3 | 1056.64 |
| 4 | 850.9 |
| 5 | 1076.96 |
| 6 | 292.1 |
| 7 | 322.58 |

Figure 5:
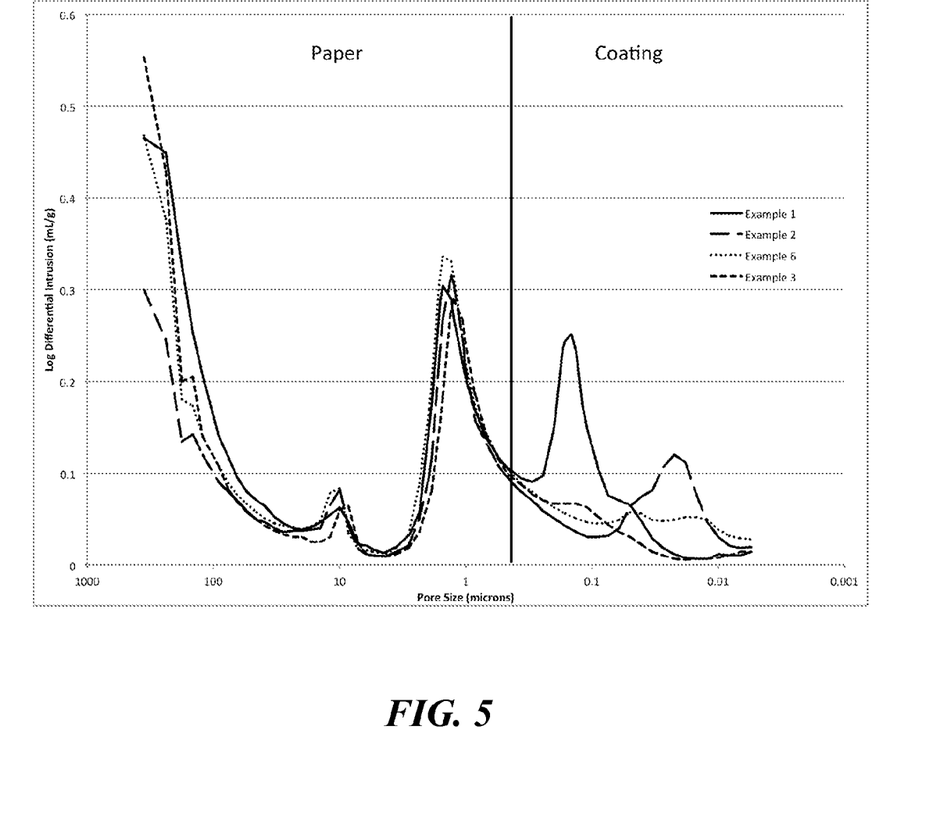
FIG. 5 is a graph illustrating effective pore sizes achieved with various materials including examples of those in accordance with the principles described herein.

FIG. 5 shows a plot of log differential intrusion in milliliters per gram (mL/g) versus pore size (microns) for some materials tested as a first layer. Porosity was determined by mercury porisimetry. Examples 1, 2 and 6 are examples of a first layer in accordance with the principles described herein. As can be seen, the composition of Example 1 exhibited an effective pore size in a range of about 0.09 microns to about 0.5 microns with a peak at about 0.2 microns; and the composition of Example 2 exhibited an effective pore size in a range of about 0.008 microns to about 0.09 microns with a peak at about 0.03 microns. The composition of Example 6 exhibited an effective pore size in a range of about 0.008 microns to about 0.09 microns with peaks at about 0.3 microns and about 0.07 microns. For purposes of comparison, the composition of Example 3 exhibited little, if any, effective pores and is not in accordance with the principles described herein. The results demonstrated that effective porosity of the first layer on the print medium substrate is important to good absorption. The higher the porosity, the better was the absorption of applied ink, which resulted in better bleed performance.

For the following examples of compositions for a second layer (Examples 8-13), the first layer was that of Example 1.

Example 8

Composition for forming the second layer was OMYAPRIME® HG30 calcium carbonate (Omya Inc.) (about 70% slurry in water) (100 parts) combined with STR® 5401 modified styrene-butadiene polymer (6 parts).

Example 9

Composition for forming the second layer was OPACARB® A40 precipitated calcium carbonate (Specialty Minerals Inc.) (about 70% slurry in water) (100 parts) combined with STR® 5401 modified styrene-butadiene polymer (6 parts).

Example 10

Composition for forming the second layer was HYDRAFINE® 90W fine clay (KaMin LLC) (about 70% slurry in water) (100 parts) combined with STR® 5401 modified styrene-butadiene polymer (6 parts).

Example 11

Composition for forming the second layer was COVERCARB® 75 ground calcium carbonate (average particle size of about 0.6 microns) (Omya Inc.) (70% slurry in water) (100 parts) combined with STR® 5401 modified styrene-butadiene polymer (6 parts).

Example 12

Composition for forming the second layer was HYDROCARB® 90 fine ground calcium carbonate (average particle size of about 0.7 microns) (Omya Inc.) (about 70% slurry in water) (100 parts) combined with STR® 5401 modified styrene-butadiene polymer (6 parts).

Example 13

Composition for forming the second layer was SYLOJET® A-25 silica gel (average particle size of about 0.2 microns) (Grace Davison Discovery Sciences, Deerfield Ill.) (about 25% slurry in water) (100 parts) combined with STR® 5401 modified styrene-butadiene polymer (6 parts).

The results of bleed performance for the compositions of Examples 8-13 for a second layer are summarized in Table 2. Lower numbers indicate better bleed performance. Bleed numbers less than 381 microns are acceptable bleed performance for the second layer materials.

TABLE 2

| Second Layer Example | Bleed (μm) |
|---|---|
| 11 | 274.32 |
| 12 | 233.68 |
| 13 | 528.32 |
| 14 | 373.38 |
| 15 | 353.06 |
| 16 | 154.94 |

Example 14

A print medium was prepared as described above. The composition for forming the first layer was KAOCAL® calcined clay (Thiele Kaolin Company) (about 50% slurry in water) (60 parts) and HYDROCARB® 60 fine ground calcium carbonate (Omya Inc.) (about 70% slurry in water) (40 parts) combined with GENCRYL® 9525 styrene/butadiene/acrylonitrile copolymer (RohmNova) (6 parts) and MOWIOL® 4-98 polyvinyl alcohol (Kuraray America, Inc.) (1 part). Coat weight of the first layer was 15 gsm. The composition for forming the second layer was OPACARB® A40 precipitated calcium carbonate (Specialty Minerals Inc.) (about 70% slurry in water) (100 parts) combined with GENCRYL® 9525 styrene/butadiene/acrylonitrile copolymer (from RohmNova) (6 parts), MOWIOL® 4-98 polyvinyl alcohol (Kuraray America, Inc.) (0.5 parts), HYDRIBRITE® TS100 OBA (from Hydrite Chemical Co., Brookfield Wis.) (0.5 parts) and Violet dye (IRGALITE® Violet BL-A) (from BASF Corporation, Florham Park N.J.) (0.0012 parts). Coat weight of the second layer was 6 gsm. The bleed performance for the resulting print medium was 264.16 microns.

Example 15

For Samples 1 and 2 below, print media were prepared as described above. Samples 3 and 4 are commercially available samples.

Sample 1:

The composition for forming the first layer was KAOCAL® calcined clay (Thiele Kaolin Company) (about 50% slurry in water) (100 parts) combined with STR® 5401 modified styrene-butadiene polymer (6 parts). Coat weight of the first layer was 15 gsm. The composition for forming the second layer was OPACARB® A40 precipitated calcium carbonate (Specialty Minerals Inc.) (about 70% slurry in water)

(100 parts) combined with STR® 5401 modified styrene-butadiene polymer (6 parts). Coat weight of the second layer was 6 gsm.

Sample 2:

The composition for forming the first layer was KAO-CAL® calcined clay (Thiele Kaolin Company) (about 50% slurry in water) (100 parts) combined with STR® 5401 modified styrene-butadiene polymer (6 parts). Coat weight of the first layer was 15 gsm. Composition for forming the second layer was OMYAPRIME® HG30 calcium carbonate (Omya Inc.) (about 70% slurry in water) (100 parts) combined with STR® 5401 modified styrene-butadiene polymer (6 parts). Coat weight of the second layer was 6 gsm.

Sample 3:

AC UTOPIA® Inkjet Dull is a commercially available inkjet web press medium from Appleton Coated (Combined Locks Wis.).

Sample 4:

NEWPAGE® TRUEJET™ Glossy print medium is commercially available inkjet web press medium from NewPage Corporation (Miamisburg Ohio).

Samples 1 and 2 are examples in accordance with the principles described herein. Samples 3 and 4 are provided for purposes of comparison. The results of various tests are summarized in Table 3.

TABLE 3

| Sample | Gamut | L*min | KOD | 75° Sheet Gloss | 75° Image Gloss | Bleed (μm) |
|---|---|---|---|---|---|---|
| 1 | 264087 | 6.2 | 2.1 | 77.6 | 95.3 | 215.9 |
| 2 | 275217 | 6.5 | 2.1 | 80.8 | 96.8 | 287.02 |
| 3 | 207995 | 21.2 | 1.6 | 30.6 | 30.3 | 264.16 |
| 4 | 232514 | 18.1 | 1.6 | 55.4 | 61.9 | 817.88 |

As can be seen, Samples 1 and 2 in accordance with the principles described herein exhibited better Gamut, L*min, KOD, 75° sheet gloss, 75° image gloss and bleed over commercially available products exemplified by Samples 3 and 4.

Gamut volume was calculated using L*a*b* values of 8 colors (cyan, magenta, yellow, black, red, green, blue, white) measured with an X-RITE® 939 Spectrophotometer (X-Rite Corporation, Grand Rapids Mich.), using D65 illuminant, and 2° observer angle.

KOD (black optical density) was measured with an X-RITE® 939 Spectrophotometer using the Density A setting.

L*min (Minimum L* value, i.e., black) testing was carried out on a black printed area and was measured with an X-RITE® 939 Spectrophotometer, using D65 illuminant and 2° observer angle.

75° Sheet Gloss testing was carried out as follows: Gloss measurement of the unprinted area of the sheet was measured with a BYK-Gardner MICRO-GLOSS® 75° Meter (BYK-Gardner USA, Columbia Md.).

75° Image Gloss testing was carried out as follows: Average 75° gloss measurement of 8 colors (cyan, magenta, yellow, black, red, green, blue, and white) was measured with the BYK-Gardner MICRO-GLOSS® 75° Meter (BYK-Gardner USA).

Bleed testing was carried out as follows: A bleed stinger pattern, 1016 micron lines (or 40 mil, where 1 mil=$\frac{1}{1000}^{th}$ of an inch) of each cyan, magenta, yellow, black, red, green, blue passing through solid area fills of each color was printed, scanned, and the distance in microns was measured for how far each colored line bleeds or infiltrates into the area fill or vice versa. The max bleed of any color combination was reported.

It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A print medium comprising:
   a first layer on at least one of a first side and a second side of a substrate, the first layer consisting essentially of at least 80% by dry weight of one or more particulate inorganic pigments (PIPs), wherein a combination of a particle size and a coat weight of the first layer on the substrate yields an effective pore size of the first layer in a range of about 0.008 to about 0.5 microns and wherein, for two or more PIPs in the first layer, the average particle size of one of the PIPs does not differ from the average particle size of another of the PIPs by more that 50%; and
   a second layer on top of the first layer, the second layer comprising a PIP having an average particle size of about 0.1 to about 2 microns.

2. The print medium according to claim 1, wherein the particulate inorganic pigment (PIP) of the first layer has an average particle size of about 0.5 to about 10 microns.

3. The print medium according to claim 1 wherein a coat weight of the first layer on the print medium substrate is about 2 to about 30 grams per square meter.

4. The print medium according to claim 1 wherein the particulate inorganic pigment (PIP) of the first layer is calcined clay, ultra-fine precipitated calcium carbonate, modified calcium carbonate, ground calcium carbonate, or combinations thereof.

5. The print medium according to claim 1 wherein the PIP of the second layer is clay, calcined clay, precipitated calcium carbonate, ground calcium carbonate, dolomite, aluminum silicate, mica, magnesium carbonate, silica, alumina, boehmite, talc, or combinations thereof.

6. A print medium comprising:
   a print medium substrate comprising a first side and a second side;
   a first layer on at least one of the first side and the second side of the print medium substrate, the first layer consisting essentially of at least 80% by dry weight of a particulate inorganic pigment (PIP) selected from the group consisting of calcined clay, modified calcium carbonate, ground calcium carbonate, ultra-fine precipitated calcium carbonate, and combinations thereof, wherein for a combination of particulate inorganic pigments (PIPs) average particle sizes of the PIPs do not differ by more than about 50%; and
   a second layer on top of the first layer, the second layer comprising a PIP having an average particle size of about 0.1 to about 2 microns.

7. The print medium according to claim 6, wherein a combination of an average particle size and a particle size distribution of the particulate inorganic pigment and a coat weight of the first layer on the print medium substrate yields an effective pore size of the first layer in the range of about 0.008 microns to about 0.5 microns.

8. The print medium according to claim 6, wherein the particulate inorganic pigment of the first layer is a combination of calcined clay and ground calcium carbonate.

9. The print medium according to claim 6, wherein the particulate inorganic pigment of the first layer has an average particle size of about 0.5 microns to about 10 microns.

10. The print medium according to claim 6 wherein a coat weight of the first layer on the print medium substrate is about 2 to about 30 grams per square meter.

11. The print medium according to claim 6 wherein the particulate inorganic pigment of the second layer is selected from the group consisting of clay, calcined clay, precipitated calcium carbonate, dolomite, aluminum silicate, mica, magnesium carbonate, silica, alumina, boehmite, talc, and combinations thereof.

12. The print medium according to claim 6 wherein the print medium substrate is paper or coated paper.

13. The print medium according to claim 6 wherein the first layer and the second layer are on both the first side and the second side of the print medium substrate.

14. The print medium according to claim 6 wherein one or both of the first layer and the second layer comprise a polymeric binder in an amount by dry weight of about 2% to about 20%.

15. A method of preparing a print medium, the method comprising:
   coating a print medium substrate with a first layer, which in a dried state consists essentially of at least 80% by dry weight of a particulate inorganic pigment selected from the group consisting of calcined clay, modified calcium carbon, ground calcium carbonate, ultra-fine precipitated calcium carbonate and combinations thereof, wherein for a combination or two or more particulate inorganic pigments average particle sizes of the particulate inorganic pigments do not differ by more than about 50%; and
   coating a second layer on top of the first layer, wherein the second layer comprises a particulate inorganic pigment having an average particle size of about 0.1 micron to about 2 microns.

* * * * *